United States Patent [19]

Mott et al.

[11] 4,221,883
[45] Sep. 9, 1980

[54] IMPACT POLYMER PROCESS

[75] Inventors: Charles L. Mott, Midland; Bernie A. Kozakiewicz, Bay City, both of Mich.

[73] Assignee: The Dow Chemical Company, Midland, Mich.

[21] Appl. No.: 733,600

[22] Filed: Oct. 18, 1976

Related U.S. Application Data

[63] Continuation of Ser. No. 563,749, Mar. 31, 1975, abandoned, which is a continuation of Ser. No. 412,085, Nov. 2, 1973, abandoned, which is a continuation of Ser. No. 237,899, Mar. 24, 1972, abandoned, which is a continuation-in-part of Ser. No. 99,305, Dec. 17, 1970, abandoned.

[51] Int. Cl.² ............................................. C08L 47/00
[52] U.S. Cl. ...................... 525/243; 525/232; 525/238; 525/241; 525/244; 525/246; 525/316; 525/326; 525/336
[58] Field of Search ...................... 260/876 R, 880 R

[56] References Cited

U.S. PATENT DOCUMENTS

| | | | |
|---|---|---|---|
| 3,576,910 | 4/1971 | Jastrzebski | 260/876 R |
| 3,663,656 | 5/1972 | Ford et al. | 260/876 R |
| 3,665,057 | 5/1972 | Tanaka et al. | 260/876 R |

Primary Examiner—J. Ziegler
Attorney, Agent, or Firm—R. B. Ingraham

[57] ABSTRACT

Rubber-reinforced alkenyl aromatic resinous polymers are prepared by polymerizing an alkenyl aromatic monomer such as styrene containing a reinforcing rubber until phase inversion occurs and subsequently adding an additional solution containing a reinforcing polymer such as rubber and containing polymerization.

11 Claims, No Drawings

IMPACT POLYMER PROCESS

This application is a continuation of our application Ser. No. 563,749 filed Mar. 31, 1975, now abandoned, which in turn is a continuation of our application Ser. No. 412,085 filed Nov. 2, 1973, now abandoned, which in turn is a continuation of our application Ser. No. 237,899 filed Mar. 24, 1972, now abandoned, which in turn is a continuation-in-part of our earlier filed application Ser. No. 99,305, filed Dec. 17, 1970, now abandoned.

A wide variety of processes are available for the preparation of impact resistant polymer compositions such as impact polystyrene and acrylonitrile/butadiene/styrene copolymers. One particularly advantageous process employs a stratifying polymerizer wherein the material is mass polymerized or at least polymerized in the presence of a minimal quantity of solvent such as up to about 25 weight percent. Such processes provide substantial difficulty when operated at higher levels of reinforcing rubber in that initial viscosity of the polymerization mixture is relatively high. Oftentimes at relatively high rubber content a product having less than the desired uniformity is obtained.

It would be desirable if there were available an improved impact polymer process providing a product having a high resistance to impact while employing a minimal quantity of rubber.

It would also be desirable if there were available a process which would prepare an impact polymer having a high impact value and good gloss.

The present invention is a method for the preparation of impact reinforced polymers wherein a polymerizable monomer composition is polymerized in the presence of a dissolved reinforcing polymer with agitation until the reinforcing polymer separates from the polymerizable mixture as a plurality of particles, continuing polymerization of the monomeric mixture and subsequently adding a solution of reinforcing polymer, the reinforcing polymer being a rubbery diene polymer containing up to 40 weight percent styrene, after at least sufficient monomer has polymerized subsequent to the separation of the reinforcing polymer particles such that phase re-inversion does not occur.

A wide variety of monomeric materials may be employed in the practice of the present invention. Of particular advantage are alkenyl aromatic monomers. By the term "alkenyl aromatic monomer" is meant an alkenyl aromatic compound having the general formula

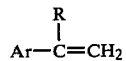

wherein Ar represents an aromatic hydrocarbon radical, or an aromatic halohydrocarbon radical of the benzene series, and R is hydrogen or the methyl radical. Examples of such alkenyl aromatic monomers are styrene, α-methylstyrene, o-methylstyrene, m-methylstyrene, p-methylstyrene, ar-ethylstyrene, ar-vinylxylene, ar-chlorostyrene or ar-bromostyrene and the like.

Generally employing alkenyl aromatic monomers, it is desirable that the alkenyl aromatic monomer be present in the range of from about 40 to 98 weight percent and from about 0 to 45 weight percent of a comonomer such as acrylonitrile, methylmethacrylate and like olefinically unsaturated monomers copolymerizable therewith. Beneficially, the reinforcing polymer or rubber is employed in a proportion of from about 2 to 40 weight percent. If the alkenyl aromatic monomer is employed without a comonomer, generally it is desirable to employ from about 3 to 20 percent by weight rubber with 97 to 80 weight percent alkenyl aromatic monomer, such as styrene. Generally if a ternary system is employed, the alkenyl aromatic monomer is present in a proportion from about 40 to 80 weight percent; the acrylonitrile from about 15 to 35 weight percent and the rubber from about 5 to 25 weight percent. Beneficially, the rubber employed in the initial feed may be from 40 to 98 weight percent of the total rubber employed, and from 60 to 2 weight percent in the second feed, and beneficially from 50 to 95 weight percent in the first stage and from 50 to 5 percent by weight in the second stage.

A wide variety of reinforcing rubbers may be employed. Suitable reinforcing rubbers are diene rubbers or mixtures of diene rubbers; i.e., any rubbery polymers (a polymer having a glass temperature not higher than 0° C., and preferably not higher than −20° C., as determined by ASTM Test D-746-52T) of one or more conjugated 1,3 dienes; e.g., butadiene, isoprene, piperylene, chloroprene, etc. Such rubbers include homopolymers and interpolymers of conjugated 1,3 dienes with up to 40 percent by weight of one or more copolymerizable monoethylenically unsaturated monomers, and preferably up to 30 weight percent, such as monovinylidene aromatic hydrocarbons (e.g., styrene; an aralkylstyrene, such as the o-, m- and p-methylstyrenes, 2,4-dimethylstyrene, the ar-ethylstyrenes, p-tert-butylstyrene, etc.; an α-alkylstyrene, such as α-methylstyrene, α-ethylstyrene, α-methyl-p-methylstyrene, etc.; vinyl naphthalene, etc.); ar-halo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); α-olefins (e.g., ethylene, propylene, etc.); pyridines; vinyl esters (e.g., vinyl acetate, vinyl stearate, etc.); isobutylene rubbers, rubbery polymers of ethylene and propylene, and the like. Chlorinated polyethylene is also employed with benefit.

Polymerization may be carried out by mass polymerization or by the mass-suspension technique wherein monomeric materials are polymerized in mass until phase separation occurs; that is, rubber-containing particles appear as distinct separate entities, and polymerization is continued until usually at least an additional 10 percent of the monomeric material has been converted to polymer and an additional solution of rubber and monomer is added with agitation to disperse the added materials throughout the reaction mixture. It is critical to the practice of the present invention that sufficient polymerization has occurred that when additional monomer and/or solvent containing reinforcing rubber is added that three separate phases form; that is, the addition of the additional monomer and rubber should not be carried out at any stage in the polymerization where the originally formed rubber particles are destroyed. Although the appropriate point is often at least after 10 percent of the additional monomeric material has been converted to polymer, the appropriate time of addition of the second reinforcing solution can be determined by microscopic examination. If the reaction mixture is sampled after phase inversion and the desired quantity of additional reinforcing material is added thereto, observation under a phase contrast microscope readily indicates whether the original rubber particles are destroyed and the solution of the second reinforcing rubber forms a desired third phase.

Polymerization of the polymerizable mixture may be accomplished by thermal polymerization generally between temperatures of 80° C. to 170° C., or alternately any free radical generating catalyst may be used in the practice of the invention, including actinic radiation. Typical free radical generating catalysts which may be employed are monomer-capable peroxy and perazo compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl carbonate, 2,5-dimethyl-2,5-di(tert-butylperoxy)hexane, 2,5-dimethyl-2,5-di(tert-butylperoxy)hexyne-3, tert-butyl hydroperoxide, cumene hydroperoxide, p-methane hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, etc., and mixtures thereof.

If desired, small amounts of antioxidants are included in the feed stream, such as alkylated phenols; e.g., di-tert-butyl-p-cresol; phosphites such as trinonyl phenyl phosphite. Such materials in general may be added at any stage during polymerization. Optionally, a wide variety of diluents may be employed in the reaction, generally such diluents being present at a level less than about 20 percent of the weight of the reaction mixture, and beneficially at about 5 to 15 parts by weight per 100 parts of polymerizable components. Such diluents may be liquid materials which are generally non-reactive under polymerization conditions and are a solvent for the polymer produced, as well as the monomer. Such diluents include dimethylformamide, acetone, methyl ethyl ketone, ethylbenzene, xylenes. Beneficially, plasticizers may be added to the feed stream or at any intermediate stage of the polymerization. Such plasticizers or lubricants include butyl stearate, zinc stearate, mineral oil.

In the process of the present invention, it is not necessary to employ the same rubber or reinforcing polymer for addition after phase inversion that was employed in the original monomer mixture; they may be like or different. The addition of like or unlike rubbers to a polymerizing system which has undergone phase inversion is one method for obtaining the product of the present invention. Employing the foregoing methods, impact resistant polymers can readily be prepared which have three, four, five or even more varieties of particles. The particles can be of either like or unlike elemental composition. Polymers prepared in accordance with the process of the invention when compared to the prior art processes are generally more uniform in tensile strength and show less variation of product and generally exhibit better flow characteristics on molding and show a relatively good combination of gloss and physical properties such as tensile strength and elongation.

The invention is further illustrated but not limited by the following examples.

EXAMPLE 1

Five mass polymerization runs are conducted in a three stage reactor. The reactor has three stirred vessels having a volume ratio of 1:1:2 and a length to diameter ratio of 3.8:1. Components are fed to the reactor at a rate of 1 pound per hour. The reactor vessels have polymerizable material capacities of 2.5 pounds, 2.5 pounds and 5 pounds, respectively. The following conditions are employed: (a) the first reactor is agitated at 200 revolutions per minute; inlet temperature 85° C.; discharge temperature 135° C.; (b) second reactor; agitator speed 150 revolutions per minute; inlet temperature 130° C.; discharge temperature 140° C.; (c) the third vessel has an agitator speed of 5 revolutions per minute; an inlet temperature of 140° C. and a discharge temperature of 170° C. The material discharging from the third reactor is passed to a devolatilization tank having a temperature of 215° C. and is under a vacuum of 30 millimeters of mercury. Sampling at the discharge of the first reactor indicates a total solids content of about 35 percent and discharge of the second reactor indicates a solids content of about 55 percent. The runs are set forth in Table I wherein the feed is indicated in parts by weight. Runs 2 and 3 are not within the scope of the invention, but are for comparative purposes only. Run 1 has a total rubber content of 15 parts, as does Run 2. However, the Izod impact (notched) strength of the compression molded material from Run 1 is 4.9, while that of Run 2 is only 3.0. Run 3 has only 10 parts of rubber without second stage addition and has an impact strength generally comparable with Run 2. Runs 4 and 5 show the addition of the additional rubber at a higher solids level; that is, the discharge of the second vessel. The addition after phase inversion of a very large portion of the rubber to the second reactor is shown to be undesirable by Run 5.

TABLE I

| Run Number | 1 | 2 | 3 | 4 | 5 |
|---|---|---|---|---|---|
| Initial Feed to First Reactor | | | | | |
| % Styrene | 60 | 60 | 60 | 60 | 60 |
| % Acrylonitrile | 20 | 20 | 20 | 20 | 20 |
| % Ethylbenzene | 10 | 10 | 10 | 10 | 10 |
| % Rubber* | 10 | 15 | 10 | 10 | 5 |
| Feed to Second Reactor (based on initial feed) | | | | | |
| % Styrene | 3 | 3 | 3 | 3 | 3 |
| % Acrylonitrile | 1 | 1 | 1 | 1 | 1 |
| % Ethylbenzene | 6 | 6 | 6 | 6 | 6 |
| % Rubber* | 5 | 0 | 0 | 5 | 10 |
| Solids at Addition Point (Weight %) | 40 | 40 | 40 | 50 | 50 |
| Product Physical Properties | | | | | |
| Tensile Yield (pounds per square inch) | 4970 | 5320 | 6210 | 4840 | 4325 |
| Tensile Rupture (pounds per square inch) | 4550 | 4710 | 5420 | 4415 | 3850 |
| % Elongation | 13 | 6 | 3 | 18 | 20 |
| Impact Strength (foot pounds per inch) | 4.9 | 3.0 | 1.5 | 4.7 | 3.3 |
| 7 foot Dart Drop - 100 mil sheet | 81 | 56 | 35 | 72 | 60 |

% Rubber* = Block copolymer of 70 percent by weight butadiene, 30 percent by weight stryrene; molecular weight 130,000; inherent viscosity 1.3; all inherent viscosities determined by viscosity of 0.3 weight percent solution in toluene at 25° C.

EXAMPLE 2

Into an agitated reactor is introduced 70 parts by weight of a solution of 90 weight percent styrene and 10 weight percent polybutadiene having an inherent viscosity of 2:1. The vessel is agitated at a speed of about 80 revolutions per minute. The reaction mixture is heated to 180° C. for three hours. Sampling of the reaction mixture indicates a total solids level of 28 weight percent. At this point, 7 parts by weight of a mixture of a solution of 2 weight percent rubber in styrene is added and heating is continued for an additional 1.5 hours. The contents of the reactor are transferred under pressure to a kettle containing about 80 pounds of water. 0.2 weight percent di-t-butylperoxide is added; also added: 0.1 weight percent of 2,6-di-t-butyl-p-cresol; 0.1 weight percent sodium hydrogen phosphate and about 0.2 weight percent hydroxypropylmethylcellulose (viscosity of a 2 weight percent solution in water at 25° C., 400 centipoise) as a suspension stabilizer. The vessel is agitated at 100 revolutions per minute and heated for four hours at 130° C.; for an additional 4 hours at 140° C., and a further four hours at 150° C. The reactor and contents are cooled. The reaction product is a plurality of small beads which are subsequently water-washed, dried and on molding of the beads the product has the following physical properties: tensile strength at yield, 3750 pounds per square inch; tensile strength at rupture, 3330 pounds per square inch; 26.9 percent elongation; Izod impact, 3.8 foot pounds; melt flow rate, 1.3; percent gel, 23; swelling index, 9.8.

and is also provided with an agitator, the first and second feed points being identical in construction. Total feed rate to the system is one pound per hour. The run employs two varieties of rubber and several concentrations with and without additional agitation. In cases where addition is made at the first or second feed points, it is obtained by dividing the feed stream which consists of styrene and rubber. The amount of rubber is set forth in Table II, the remainder of the polymerizable feed being styrene. The feed contains one part of ethylbenzene for 9 parts by weight of styrene plus rubber. The polymer from the third vessel is devolatilized in the manner of Example 1. The polymerization conditions are as follows: agitation speed in the first, second and third vessels, 50 revolutions per minute, 25 revolutions per minute and 2 revolutions per minute, respectively; temperature at the inlet of the first vessel, 120° C.; at the discharge of the first vessel, 124° C.; at the inlet of the second vessel, 124° C.; at the discharge of the second vessel, 130° C.; at the inlet of the third vessel, 140° C. and at the discharge of the third vessel, 170° C. Variations in feed composition and mixer speed at the point of addition are set forth in Table II as are the resultant physical properties obtained after devolatilization and molding of the polymer. Where a solids level is indicated as 45 percent and 50 percent, the addition is made

TABLE II

| RUN NO. | FIRST REACTOR FEED - % RUBBER ADDED | SECOND REACTOR FEED - % RUBBER ADDED | ADDITION POINT MIXER$_1$ | % SOLIDS AT ADDITION POINT | INJECTION MOLDED GLOSS$_2$ | IMPACT$_3$ | TENSILE YIELD$_4$ | % ELONGATION | % GEL |
|---|---|---|---|---|---|---|---|---|---|
| 1 | 4 (4)* | 1 (4)* | 0 | 50 | 60 | 0.90 | 3900 | 22 | 17 |
| 2 | 5 (4) | None | 0 | 50 | 35 | 0.51 | 3700 | 5 | 16 |
| 3 | 5 (1) | 0.5 (2) | 0 | 45 | 60 | 0.83 | 4350 | 14 | 13.4 |
| 4 | None | 0.5 (2) | 0 | 45 | 65 | 0.21 | 5500 | 1.0 | 4.0 |
| 5 | 8 (1) | None | 0 | 0 | 78 | 0.50 | 4320 | 2.0 | 8.0 |
| 6 | 8 (1) | 1.0 (2) | 0 | 45 | 38 | 1.6 | 3950 | 20 | 9.8 |
| 7 | None | 1.0 (2) | 0 | 45 | 50 | 0.30 | 5100 | 2.0 | 4.0 |
| 8 | None | 2.0 (2) | 0 | 45 | 36 | 0.32 | 5050 | 2.0 | 6.0 |
| 9 | 8 (1) | 1.0 (2) | 0 | 30 | 67 | 1.16 | 3730 | 6.0 | 15 |
| 10 | 8 (1) | 1.0 (2) | 25 | 30 | 76 | 1.17 | 3540 | 6.5 | 18 |
| 11 | 8 (1) | 1.0 (2) | 0 — + reduced 2nd stage rpm's | 30 | 42 | 1.61 | 3470 | 30.5 | 18.5 |
| 12 | None | 1.0 (2) | 0 | 30 | 71 | 0.31 | 5260 | 1.5 | 3.0 |
| 13 | 5 (1) | None | 0 | | 80 | 0.36 | 5085 | 2.0 | 6.6 |
| 14 | 5 (1) | 0.5 (1) | 50 | 45 | 75 | 0.40 | 5000 | 2.0 | 13 |
| 15 | 5 (1) | 0.5 (1) | 0 | 45 | 63 | 0.72 | 4640 | 6.5 | 12.5 |
| 16 | None | 0.5 (1) | 0 | 45 | 80 | 0.3 | 5200 | 1.5 | 4.0 |

FOOTNOTES-
(1) = revolutions per minute
(2) = distinctiveness of image - Hunter gloss meter
(3) = foot pounds per inch (Notched Izod)
(4) = pounds per square inch
*Rubber Identification-
(4) = polybutadiene; inherent viscosity 2.1
(1) = styrene/butadiene block copolymer - 70 weight percent butadiene, 30 weight percent styrene; inherent viscosity of 1.5
(2) = polybutadiene - inherent viscosity 2.3

EXAMPLE 3

A plurality of mass polymerization runs are conducted in a three stage reactor. The reactors have three stirred vessels having a volume ratio of 1:1:1, respectively, and a length to diameter ratio of 4. Each of the vessels has a variable speed agitator, and between the first and second vessels is a first feed point which consists of an agitator in a tee wherein a side stream may be introduced to the stream as it passes from the first vessel to the second vessel. A second feed inlet is located in the line connecting the second vessel to the third vessel at the second addition point, and where the solids level is indicated as 30 percent, addition is made at the first addition point.

EXAMPLE 4

Employing the apparatus of Example 1, a plurality of rubber reinforced polymers are prepared. Runs 2, 3, 4 and 5 of Table III are in accordance with the present invention, whereas Runs 1, 6, 7 and 8 are for comparative purposes. Where two amounts or rubber are indicated, the first and larger amount is the amount in the feed to the first stage and the second amount is the amount added to the second reactor.

TABLE III

| RUN NO. | % RUBBER ADDED | IMPACT₃ | INJECTION MOLDED GLOSS₂ | TENSILE YIELD₄ | TENSILE RUPTURE₃ | % ELONGATION |
|---|---|---|---|---|---|---|
| 1 | 10 (4) | 1.8 | 30 | 3800 |  | 15 |
| 2 | 10 (4)<br>2 (2) | 2.4 |  | 3610 | 2970 | 20 |
| 3 | 10 (4)<br>4 (2) | 2.8 |  | 3350 | 2550 | 21 |
| 4 | 10 (4)<br>6 (2) | 3.4 |  | 3152 | 2425 | 24 |
| 5 | 10 (4)<br>8 (2) | 4.6 | 24 | 2800 | 2115 | 37 |
| 6 | 12 (2) | 1.9 | 12 | 2720 | 2050 |  |
| 7 | 14 (2) | 2.2 | 7.5 | 2700 | 2020 | 25 |
| 8 | 16 (2) | 2.3 | 5 | 2560 | 1870 | 30 |

NOTE:
See Page 14 for footnotes and rubber identification

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a method for the preparation of impact or rubber reinforced alkenyl aromatic polymers wherein a polymerizable monomer composition is mass or mass-suspension polymerized in the presence of up to about 25 weight percent solvent based on the weight of the reaction mixture of a dissolved reinforcing polymer with agitation until the reinforcing polymer separates from the polymerizable monomer mixture as a plurality of particles to thereby result in phase inversion, wherein the polymerizable composition has from about 40 to 98 percent by weight of an alkenyl aromatic monomer, from about 0 to 45 weight percent of an olefinically unsaturated monomer copolymerizable with the alkenyl aromatic monomer and from about 2 to 40 weight percent of a rubbery butadiene reinforcing polymer having a glass temperature not higher than 0° C., the polymer containing at least 60 weight percent butadiene polymerized therein and up to 40 percent by weight of one or more ethylenically unsaturated monomers polymerized therein, the improvement which comprises polymerizing the composition until separation of reinforcing polymer from the mixture occurs, the mixture containing 40 to 98 weight percent of the desired amount of reinforcing polymer, and polymerizing the composition until at least an additional 10 percent amount of monomer has been converted to polymer, adding to the mixture with agitation a monomer solution containing from 60 to 2 weight percent of the total reinforcing polymer of a rubbery butadiene reinforcing polymer, the addition being made after separation of the particles or phase inversion and after sufficient additional polymerization has occurred such that phase reinversion does not occur.

2. The method of claim 1 wherein the polymerizable monomer is a mixture of styrene and acrylonitrile.

3. The method of claim 1 wherein the reinforcing polymer is added when less than 80 weight percent of the monomeric material has been converted to polymer.

4. The method of claim 1 wherein subsequent to the addition of the solution of reinforcing polymer the reaction mixture is dispersed as a plurality of droplets in water and subsequently polymerization is completed.

5. The method of claim 1 wherein the reinforcing polymer is rubber.

6. The method of claim 1 wherein the rubber added after phase inversion is dissolved in a monomer composition approximating the composition of the polymerizable composition.

7. The method of claim 1 wherein the monomer composition is styrene.

8. The method of claim 7 wherein the reinforcing polymer is from 2 to 20 weight percent.

9. The method of claim 1 wherein the solution of rubbery butadiene polymer contains from 5 to 50 percent of the total reinforcing polymer.

10. The method of claim 7 wherein the reinforcing polymer is from 2 to 20 weight percent.

11. The method of claim 1 wherein the alkenyl aromatic monomer is present in a proportion of from about 40 to 80 weight percent, the copolymerizable monomer is acrylonitrile and is present in a proportion of from about 15 to 35 weight percent and rubber is present in a proportion of from about 5 to 25 weight percent.

* * * * *